United States Patent
Chou

(10) Patent No.: US 6,931,459 B2
(45) Date of Patent: Aug. 16, 2005

(54) DUPLICATOR FOR RECORDING MEDIUM AND METHOD FOR DUPLICATING RECORDING MEDIUM

(76) Inventor: Yu-Sheng Chou, 7F., No. 13, Lane 155, Sec. 3, Pei-Shen Road, Shenkeng, Taipei Hsien (TW)

( * ) Notice: Subject to any disclaimer, the term of this patent is extended or adjusted under 35 U.S.C. 154(b) by 0 days.

(21) Appl. No.: 10/328,817

(22) Filed: Dec. 24, 2002

(65) Prior Publication Data

US 2004/0122993 A1 Jun. 24, 2004

(51) Int. Cl.[7] .............................. G06F 3/00; G06F 13/28; G06F 3/06
(52) U.S. Cl. ........................ 710/55; 710/52; 710/5; 710/22
(58) Field of Search ............................ 711/112; 386/68; 710/52, 55, 22, 26, 27, 5, 6

(56) References Cited

U.S. PATENT DOCUMENTS 6,131,141 A * 10/2000 Ravid .......................... 711/112
2002/0118951 A1 * 8/2002 Suzuki et al. ................. 386/68

* cited by examiner

*Primary Examiner*—Jeffrey Gaffin
*Assistant Examiner*—Joshua D Schneider
(74) *Attorney, Agent, or Firm*—Gauthier & Connors LLP

(57) ABSTRACT

A method for duplicating recording medium includes detecting a source recording medium and a plurality of target recording mediums. A source DMAC is configured for the source recording medium and a plurality of target DMACs for the target recording mediums. The data of a source recording medium is transmitted to a source FIFO buffer through the source DMAC. The data of the source FIFO buffer is transmitted to a plurality of target FIFO buffers through a multiplexer. The data of a plurality of target FIFO buffers is transmitted to a plurality of target recording mediums through a plurality of target DMACs.

2 Claims, 3 Drawing Sheets

DUPLICATOR FOR RECORDING MEDIUM AND METHOD FOR DUPLICATING RECORDING MEDIUM

FIELD OF THE INVENTION

The present invention relates to a duplicator for recording medium and a method for duplicating recording medium, more particularly to a duplicator for recording medium and a method for duplicating recording medium, wherein a fast duplicating effect is achieved by FIFO buffers and direct memory access controllers (DMACs).

DESCRIPTION OF THE RELATED ART

Conventionally, in a duplicator for recording medium, for example as described in U.S. Pat. No. 6,131,141, a control signal generator is used to decide on/off of a data bus switch and a control signal switch to control the flow of source data. That is to say, when the control signal generator determines that a duplication of data can be proceeded, a signal is sent to turn on the data bus switch and the control signal switch, and data output from a source data terminal (hardware) are transmitted to each duplicator to complete a duplicating procedure.

However, in the prior art mentioned above, the duplication of second data starts after the duplication of first data is completed. The duplication of third data starts after the duplication of second data is completed, and so on. Therefore, there is a propagation delay in duplicating data. When large volume of data are to be duplicated, it is time-consuming.

SUMMARY OF THE INVENTION

According to one aspect of the invention, there is provided a method for duplicating recording medium. The method includes detecting a source recording medium and a plurality of target recording mediums. A source DMAC is configured for the source recording medium and a plurality of target DMACs for the target recording mediums. The data of a source recording medium is transmitted to a source FIFO buffer through the source DMAC. The data of the source FIFO buffer is transmitted to a plurality of target FIFO buffers through a multiplexer. The data of a plurality of target FIFO buffers is transmitted to a plurality of target recording mediums through a plurality of target DMACs.

According to another aspect of the invention, there is provided a method for comparing recording medium. The method includes detecting a source recording medium and a plurality of target recording mediums. A source DMAC is configured for the source recording medium and a plurality of target DMACs for the target recording mediums. The data of a source recording medium is transmitted to a source FIFO buffer through the source DMAC. The data of a plurality of target recording mediums is transmitted to a plurality of target FIFO buffers through a plurality of target DMACs. The data of the source FIFO buffer is transmitted to a plurality of comparators through a multiplexer. The data of the source FIFO buffer is compared with the data of the target FIFO buffer by a plurality of comparators.

DESCRIPTION OF THE PREFERRED EMBODIMENT

Figure 1:
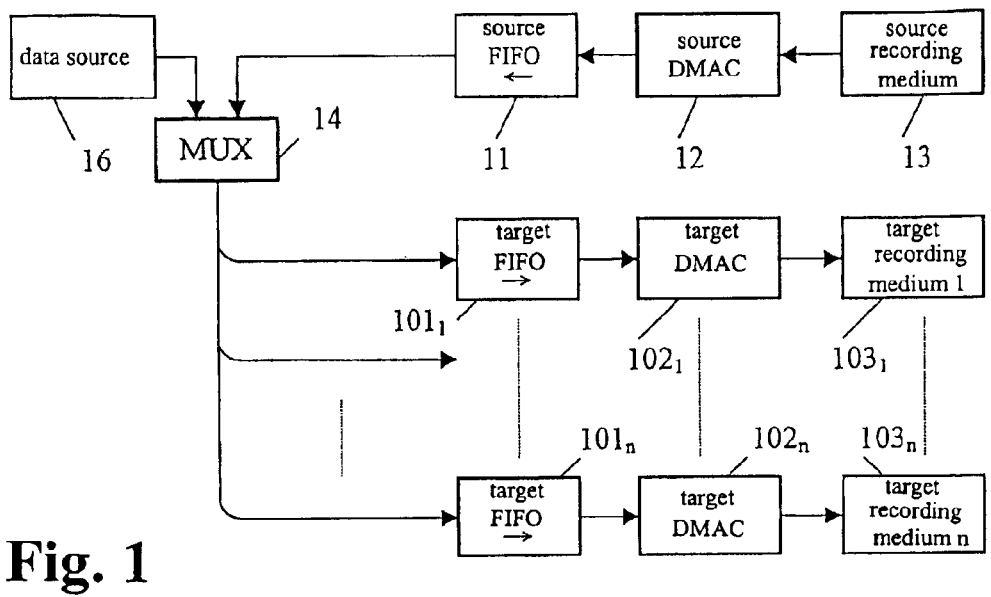
FIG. 1 is a block diagram of the duplicator according to the first embodiment of the present invention.

Now referring to FIG. 1, the duplicator for recording medium according to the first embodiment of the present invention comprises: a source recording medium 13; a source DMAC 12; a source FIFO buffer 11; a multiplexer 14; a plurality of target FIFO buffers $101_1$, $101_2$, ... and $101_n$; a plurality of target DMACs $102_1$, $102_2$, ... and $102_n$; and a plurality of target recording mediums $103_1$, $103_2$, ... and $103_n$. When a source recording medium 13 is detected, a source DMAC 12 is configured. The data of the source recording medium 13 are transmitted to the source FIFO buffer 11 through the source DMAC 12. When the data of the source FIFO buffer 11 are not empty, the data of the source FIFO buffer 11 are transmitted to a plurality of target FIFO buffers ($101_1$, $101_2$, ... and $101_n$) through a multiplexer 14. Thereafter, the data of target FIFO buffers ($101_1$, $101_2$, ... and $101_n$) are transmitted and duplicated to the target recording medium ($103_1$, $103_2$, ... and $103_n$) through the target DMACs ($102_1$, $102_2$, ... and $102_n$).

Alternatively, when the data to be duplicated are from an external data source 16, the data of the data source 16 are transmitted to a plurality of target FIFO buffers ($101_1$, $101_2$, ... and $101_n$) through the multiplexer 14. Thereafter, the data of target FIFO buffers ($101_1$, $101_2$, ... and $101_n$) are transmitted and duplicated to the target recording medium ($103_1$, $103_2$, ... and $103_n$) through the target DMACs ($102_1$, $102_2$, ... and $102_n$).

A transferring interface can be provided between the source recording medium 13 and the source DMAC 12 for connection. The transferring interface could be an ATA, serial ATA or SCSI control interface, depending on what the source recording medium 13 is.

Figure 2:
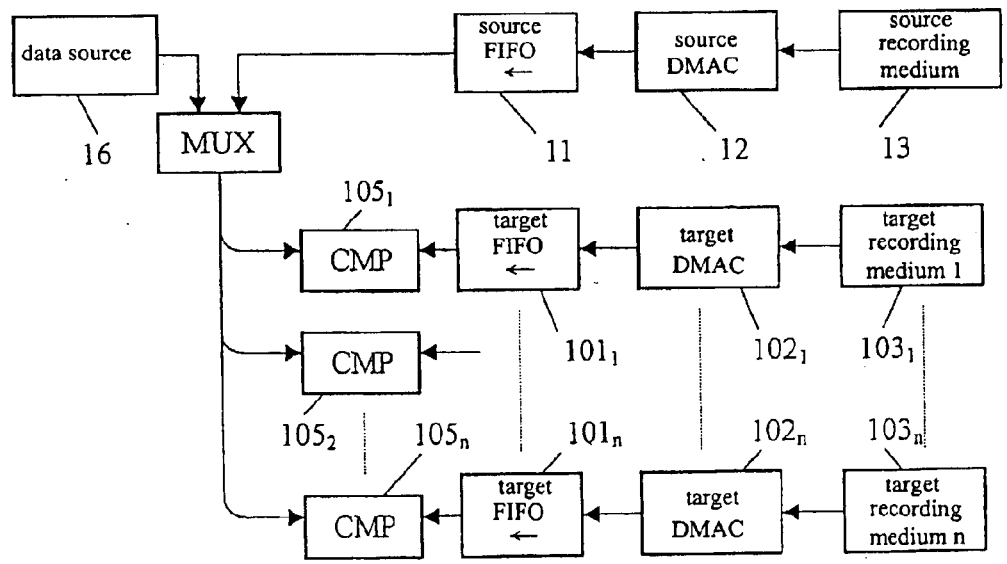
FIG. 2 is a block diagram of the duplicator according to the second embodiment of the present invention.

Now referring to FIG. 2, the duplicator for recording medium according to the second embodiment of the present invention comprises:

a source recording medium 13; a source DMAC 12; a source FIFO buffer 11; a multiplexer 14; a plurality of comparators $105_1$, $105_2$, ... and $105_n$; a plurality of target FIFO buffers $101_1$, $101_2$, ... and $101_n$; a plurality of target DMACs $102_1$, $102_2$, ... and $102_n$; and a plurality of target recording mediums $103_1$, $103_2$, ... and $103_n$. When a source recording medium 13 is detected, a source DMAC 12 is configured. The data of the source recording medium 13 are transmitted to the source FIFO buffer 11 through the source DMAC 12. When the data of the source FIFO buffer 11 are not empty, the data of the source FIFO buffer 11 are transmitted to a plurality of comparators ($105_1$, $105_2$, ... and $105_n$) through a multiplexer 14. The data of the target recording medium ($103_1$, $103_2$, ... and $103_n$) are transmitted to the target FIFO buffers ($101_1$, $101_2$, ... and $101_n$) through the target DMACs ($102_1$, $102_2$, ... and $102_n$). Thereafter, the data of source FIFO 11 are compared with the data of target FIFO buffers ($101_1$, $101_2$, ... and $101_n$) by comparators ($105_1$, $105_2$, ... and $105_n$), respectively.

Alternatively, when the data to be compared are from an external data source 16, the data of the data source 16 are transmitted to a plurality of comparators ($105_1$, $105_2$, ... and $105_n$) through the multiplexer 14. The data of the target recording medium ($103_1$, $103_2$, ... and $103_n$) are transmitted to the target FIFO buffers ($101_1$, $101_2$, ... and $101_n$) through the target DMACs ($102_1$, $102_2$, ... and $102_n$). Thereafter, the data of the data source 16 are compared with the data of target FIFO buffers ($101_1$, $101_2$, ... and $101_n$) by comparators ($105_1$, $105_2$, ... and $105_n$), respectively.

A transferring interface can be provided between the source recording medium 13 and the source DMAC 12 for connection. The transferring interface could be an ATA, serial ATA or SCSI control interface, depending on what the source recording medium 13 is.

Figure 3:
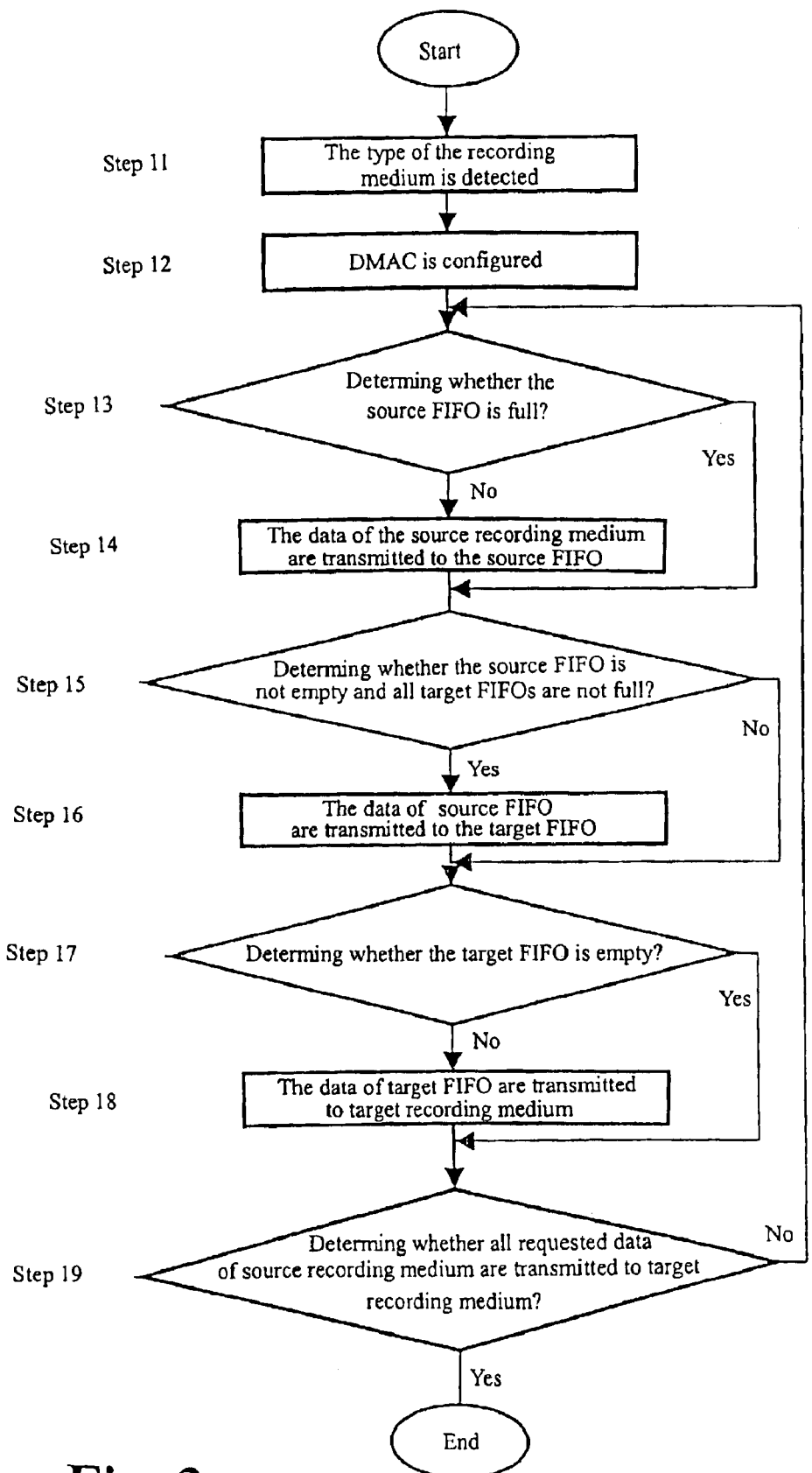
FIG. 3 is a flow chart showing the method for duplicating recording medium according to the third embodiment of the present invention.

FIG. 3 shows the flow chart of method for duplicating recording medium according to the third embodiment of the present invention.

First, at Step 11, the type of the recording medium is detected. Consequently, at Step 12, DMAC is configured according to the type of the recording medium. Step 13 determines whether the source FIFO is full. If the determining result of Step 13 is No, the process proceeds to Step 14. At Step 14, the data of the source recording medium are transmitted to the source FIFO. If the determining result of Step 13 is Yes, the process proceeds to Step 15. Step 15 determines whether the source FIFO is not empty and all target FIFOs are not full. If the determining result of Step 15 is Yes, the process proceeds to Step 16. At Step 16, the data of source FIFO are transmitted to the target FIFO. If the determining result of Step 15 is No, i.e. the source FIFO is empty or the target FIFO is full, the process proceed to Step 17. Step 17 determines whether the target FIFO is empty. If the determining result of Step 17 is No, the process proceeds to Step 18. At Step 18, the data of target FIFO are transmitted to target recording medium. If the determining result of Step 17 is Yes, the process proceeds to Step 19. Step 19 determines whether all requested data of source recording medium are transmitted to target recording medium. If the determining result of Step 19 is Yes, the process goes to end. If the determining result of Step 19 is No, the process proceeds to Step 13.

Figure 4:
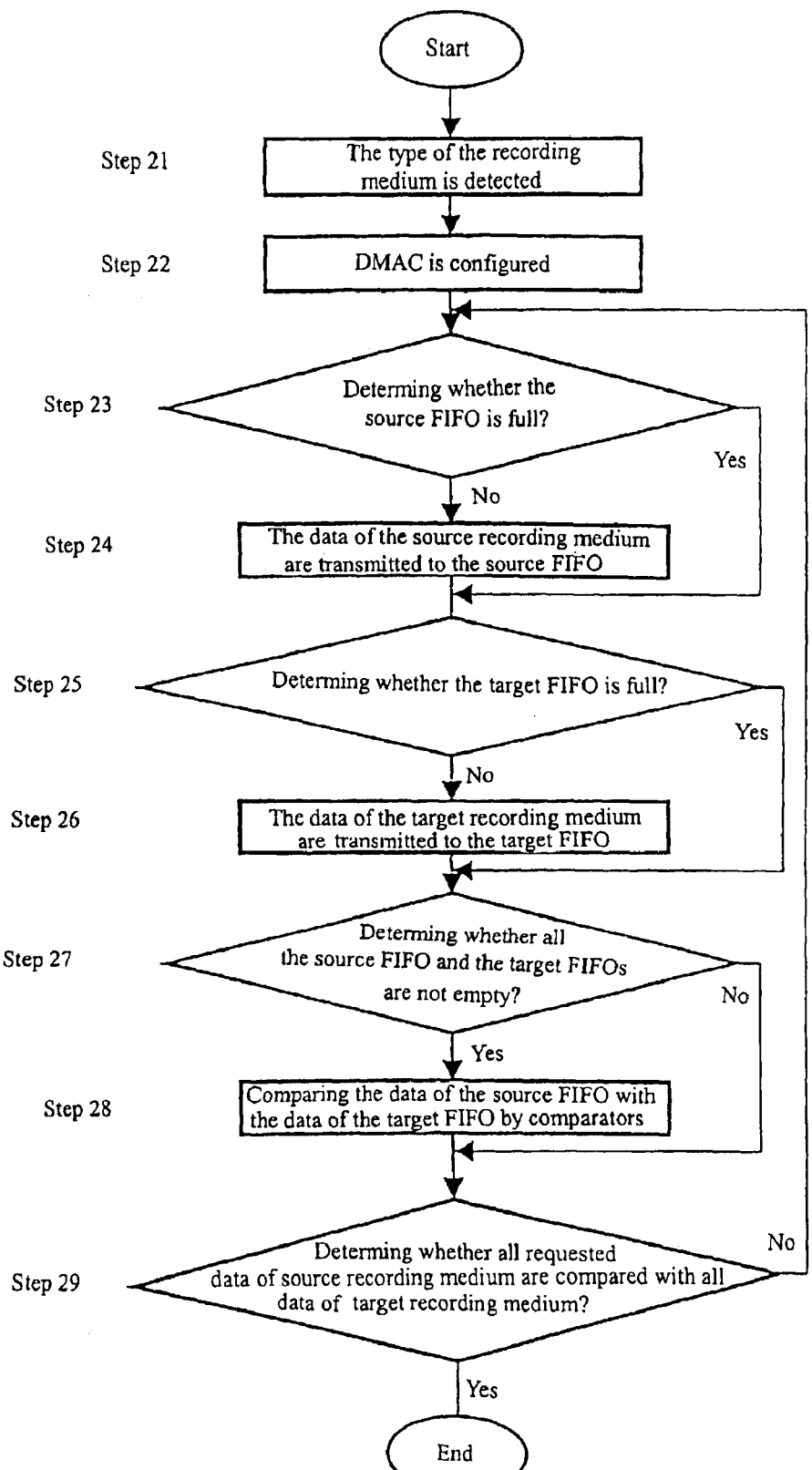
FIG. 4 is a flow chart showing the method for comparing recording medium according to the third embodiment of the present invention.

FIG. 4 shows the flow chart of method for comparing recording medium according to the third embodiment of the present invention.

First, at Step 21, the type of the recording medium is detected. Consequently, at Step 22, DMAC is configured according to the type of the recording medium. Step 23 determines whether the source FIFO is full. If the determining result of Step 23 is No, the process proceeds to Step 24. At Step 24, the data of the source recording medium are transmitted to the source FIFO. If the determining result of Step 23 is Yes, the process proceeds to Step 25. Step 25 determines whether the target FIFO is full. If the determining result of Step 25 is No, the process proceeds to Step 26. At Step 26, the data of the target recording medium are transmitted to the target FIFO. If the determining result of Step 25 is Yes, the process proceeds to Step 27. Step 27 determines whether all the source FIFO and the target FIFOs are not empty. If the determining result of Step 27 is Yes, the process proceeds to Step 28. Step 28 compares the data of the source FIFO with the data of the target FIFO by comparators. If the determining result of Step 27 is No, the process proceeds to Step 29. Step 29 determines whether all requested data of source recording medium are compared with all data of target recording medium. If the determining result of Step 29 is Yes, the process goes to end. If the determining result of Step 29 is No, the process proceeds to Step 23.

While several embodiments of the present invention have been described using specific terms, such description is for illustrative purposes only, and it should be understood that changes and variations may be made without departing from the spirit of scope of the following claims.

What is claimed is:

1. A method for duplicating recording medium, comprising the steps of:
    detecting a source recording medium and a plurality of target recording mediums;
    configuring a source DMAC for said source recording medium and a plurality of target DMACs for said target recording mediums;
    transmitting the data of a source recording medium to a source FIFO buffer through said source DMAC;
    transmitting the data of said source FIFO buffer to a plurality of target FIFO buffers through a multiplexer; and
    transmitting the data of a plurality of target FIFO buffers to a plurality of target recording mediums through a plurality of target DMACs.

2. A method for comparing recording medium, comprising the steps of:
    detecting a source recording medium and a plurality of target recording mediums;
    configuring a source DMAC for said source recording medium and a plurality of target DMACs for said target recording mediums;
    transmitting the data of a source recording medium to a source FIFO buffer through said source DMAC;
    transmitting the data of a plurality of target recording mediums to a plurality of target FIFO buffers through a plurality of target DMACs;
    transmitting the data of said source FIFO buffer to a plurality of comparators through a multiplexer; and
    comparing the data of said source FIFO buffer with the data of said target FIFO buffer by a plurality of comparators.

* * * * *